UNITED STATES PATENT OFFICE.

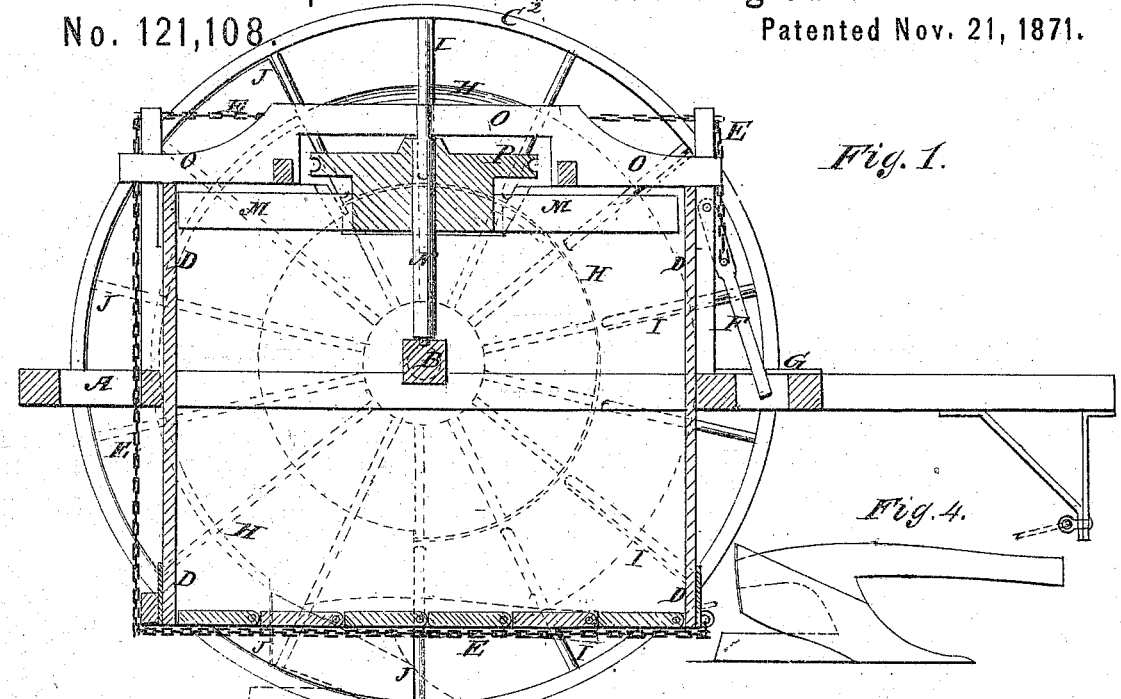
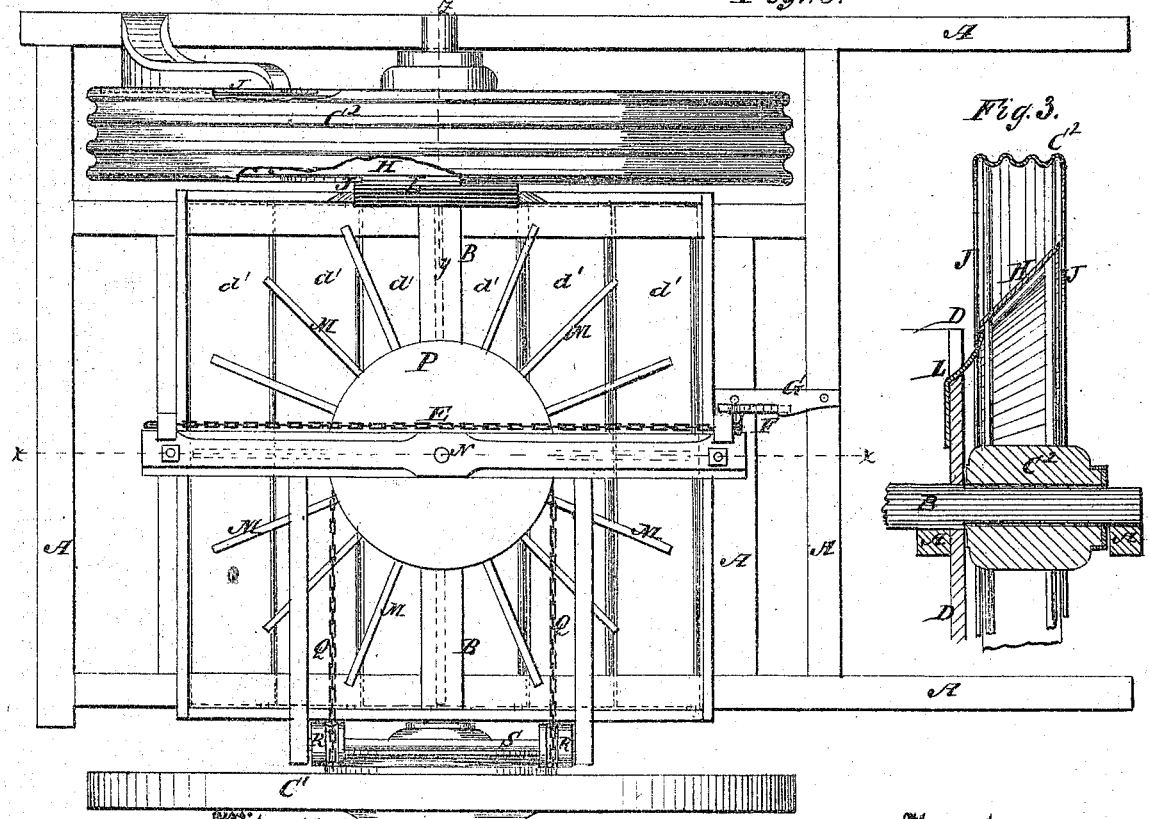

JESSE KING, OF OSWEGO, NEW YORK.

IMPROVEMENT IN EXCAVATING-CARTS.

Specification forming part of Letters Patent No. 121,108, dated November 21, 1871.

*To all whom it may concern:*

Be it known that I, JESSE KING, of Oswego, in the county of Oswego and State of New York, have invented a new and useful Improvement in Earth and Grading-Cart; and I do hereby declare that the following is a full, clear, and exact description thereof, which will enable others skilled in the art to make and use the same, reference being had to the accompanying drawing forming part of this specification, in which—

Figure 1 is a vertical longitudinal section of my improved cart, taken through the line $x\ x$ of Fig. 2. Fig. 2 is a top view of the same. Fig. 3 is a detail section taken through the line $y\ y$, Fig. 2. Fig. 4 is a detail side view of the plow.

Similar letters of reference indicate corresponding parts.

My invention has for its object to furnish an improved cart for moving earth, designed especially for use in grading roads and grounds, and which shall be so constructed as to load itself, and which may be conveniently unloaded either at once or gradually, as may be desired. My invention consists in the improvement of excavators, as hereinafter fully described and subsequently pointed out in the claim.

A are the shafts and frame-work of the cart, to which is attached the axle B, upon the journals of which the wheels $C^1\ C^2$ revolve. D is the box, which is securely attached to the frame A and axle B. The box D is made with vertical sides and ends, and is made deep extending nearly to the ground. The bottom of the box D is formed of slats $d'$, the ends of which, at or near their forward edges, are pivoted to the sides of the box D, at or near their lower edges. The middle part of the lower or rear edges of the eccentrically-pivoted slats $d'$ are attached to a chain, E, which extends longitudinally across the bottom, up the rear side, and longitudinally across the top of the box D, and its end is attached to a lever, F, the lower end of which is pivoted to a standard or other support attached to the box D or frame A. By this construction, by raising the free end of the lever F into a vertical position, the chain E will be slackened, allowing the rear edges of the slots $d'$ to drop, discharging the earth. By lowering the free end of the lever F the chain E will be drawn taut, closing the slats $d'$, in which position the said lever F may be locked by catching it upon a catch, G, attached to the frame A. One of the wheels, as $C^1$, may be made in the ordinary manner. The other, as $C^2$, is made with a wide rim, which I prefer to make corrugated upon its face, as shown in Figs. 2 and 3. The edges of the rim of the wheel $C^2$ are connected with the end parts of the hub by a double set of spokes, as shown in Fig. 3. To the spokes of the wheel $C^2$, at a suitable distance from the rim of the wheel, is attached an inclined rim or partition, H. To the spokes of the wheel $C^2$, between the outer and inner rims of said wheel, or to a suitable number of said spokes, are attached partitions I, which, in connection with said outer and inner rims, form buckets for carrying up the earth. To brackets attached to the frame-work of the machine, upon each side of the rear part of the wheel $C^2$, are attached plates J, curved to the arc of the wheel, and of such a width as to cover the space between the edges of the rims of the wheel $C^2$ to prevent the earth from falling from the buckets while being carried up by the said wheel. The lower end of the inner guard-plate J extends down to about the vertical line of the axis of the wheel, and the lower end of the outer guard-plate J does not extend down so far, space being left to receive the earth thrown up by the plow K, which strikes against the inner side of the lower part of the inner guard-plate J. The plow K is drawn by a chain or rod attached to the frame or shaft A of the machine, and is so arranged as to throw the earth raised by the plow into the buckets of the wheel $C^2$, its share being made flatter and its mold-board more vertical than in ordinary plows that are required to turn bottom upward the earth raised by them. As the dirt in the buckets of the wheel $C^2$ comes to the upper ends of the guard-plates J it slides down the incline L attached to the upper edge of the side of the box D, and falls into the said box. As the dirt falls into the box D it is distributed by a paddle-wheel, M, pivoted to a vertical shaft, N, attached to the axle B, and a cross-bar, O, attached to the upper edges of the box D. The paddles of the wheel M may be made straight or curved; I prefer to make them curved, as distributing the earth better. To the paddle-wheel M is rigidly attached a pulley, P, around which passes a chain, Q, which passes over guide-pulleys R attached to the side edge of the top of the box D and around a pulley, S, attached to or formed upon the wheel C¹, so that the paddle-wheel M may be operated by the advance of the machine.

Having thus described my invention, what I claim as new, and desire to secure by Letters Patent, is—

1. The horizontal paddle-wheel M, arranged within the upper part of the earth-box, combined with a rotary bucket-carrier, discharging the soil over one side of the box, as described.

2. The arrangement of chain Q and pulleys P R S, as and for the purpose specified.

JESSE KING.

Witnesses:
C. M. BARNES,
E. A. SWETTENHAM.

(51)